(12) United States Patent  
Trigg et al.

(10) Patent No.: US 7,712,413 B2
(45) Date of Patent: May 11, 2010

(54) PRINTABLE COVER SYSTEMS FOR ARTICLES

(75) Inventors: Larry E. Trigg, Santa Clara, CA (US); Sam Lucente, San Francisco, CA (US); Allison Johnson, Menlo Park, CA (US); Paul E Bradley, Redwood City, CA (US); Arvind Kumar Gupta, Van Nuys, CA (US); Kara Whitney Johnson, San Francisco, CA (US); Matthias Wieser, San Francisco, CA (US); Matthew Robert Adams, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 10/923,304

(22) Filed: Aug. 20, 2004

(65) Prior Publication Data

US 2006/0037507 A1 Feb. 23, 2006

(51) Int. Cl.
*B41F 3/08* (2006.01)
(52) U.S. Cl. ...................... 101/483; 156/391
(58) Field of Classification Search ................ 101/483; 156/391; 399/389; 283/71, 81, 101, 106
See application file for complete search history.

(56) References Cited

U.S. PATENT DOCUMENTS

| | | | |
|---|---|---|---|
| 3,687,769 A | 8/1972 | Dague | |
| 4,317,852 A | 3/1982 | Ogden | |
| 4,385,460 A | 5/1983 | Hanna | |
| 4,478,866 A * | 10/1984 | Ohta et al. | 426/549 |
| 4,687,536 A | 8/1987 | Hiramatsu et al. | |
| 4,903,255 A | 2/1990 | Sugaya et al. | |
| 5,417,457 A | 5/1995 | Reinhardt | |
| 5,421,950 A | 6/1995 | Parrish | |

(Continued)

FOREIGN PATENT DOCUMENTS

DE 29613123 11/1996

(Continued)

OTHER PUBLICATIONS

PowerDesign USA Website (www.powerdesignusa.com/products/ipod/real.php), pp. 1-3, Copyright 2001-2004.

(Continued)

*Primary Examiner*—Ren Yan

(57) ABSTRACT

A printable label assembly includes a printable label having an adhesive coating applied to a first surface thereof to facilitate attachment of the label to an article. The label is configured to receive a printed image on a second surface thereof. A removable backing is releasably attached to the adhesive coating and has at least three sections: a removable primary section releasably attached to a central portion of the adhesive coating of the label and being configured to be removed from the central portion to expose the central portion for attachment to the article; and a pair of removable handle sections releasably attached to outward portions of the adhesive coating of the label, the handle sections being configured to remain on the adhesive coating of the label after removal of the primary section to provide at least two handling points for manipulation by a user to assist the user in applying the label to the article.

7 Claims, 3 Drawing Sheets

U.S. PATENT DOCUMENTS

| | | | |
|---|---|---|---|
| 5,484,168 A * | 1/1996 | Chigot | 283/67 |
| 5,497,701 A * | 3/1996 | Uland | 101/288 |
| 5,543,001 A | 8/1996 | Casillo et al. | |
| 5,715,934 A | 2/1998 | Tobol et al. | |
| 5,783,033 A | 7/1998 | Grossman | |
| 5,789,050 A * | 8/1998 | Kang | 428/42.3 |
| 5,799,982 A * | 9/1998 | McClure et al. | 283/81 |
| 5,902,446 A | 5/1999 | Casillo et al. | |
| 6,196,290 B1 | 3/2001 | Tracy et al. | |
| 6,321,814 B1 | 11/2001 | Tracy et al. | |
| 6,479,118 B1 * | 11/2002 | Atkinson | 428/40.1 |
| 6,481,572 B2 * | 11/2002 | Wien et al. | 206/232 |
| 6,514,588 B2 * | 2/2003 | Rosenbaum et al. | 428/40.1 |
| 6,576,315 B2 * | 6/2003 | Treleaven et al. | 428/40.1 |
| 6,689,238 B2 * | 2/2004 | Barnet | 156/60 |
| 6,716,492 B1 * | 4/2004 | Moriya et al. | 428/32.1 |
| 6,803,084 B1 * | 10/2004 | Do et al. | 428/40.1 |
| 2004/0101646 A1 * | 5/2004 | Hodsdon et al. | 428/40.1 |
| 2004/0213943 A1 * | 10/2004 | Viby | 428/40.1 |
| 2005/0048244 A1 * | 3/2005 | Do et al. | 428/42.3 |
| 2005/0178506 A1 * | 8/2005 | Flynn et al. | 156/391 |
| 2006/0037507 A1 | 2/2006 | Trigg | |
| 2007/0082162 A1 | 4/2007 | Trigg | |

FOREIGN PATENT DOCUMENTS

| | | |
|---|---|---|
| DE | 29800751 | 6/1998 |
| EP | 1376580 | 1/2004 |
| JP | 05 290546 | 11/1993 |
| JP | 2002 182569 | 6/2002 |
| JP | 2001-101827 * | 3/2010 |
| WO | WO 01/28866 | 4/2001 |
| WO | WO 01/84550 | 11/2001 |
| WO | WO 01/89821 | 11/2001 |
| WO | WO 2001/089825 A1 * | 3/2010 |

OTHER PUBLICATIONS

PowerDesign USA Website (www.powerdesignusa.com/products/ipod/selfdesign.php), pp. 1-2, Copyright 2001-2004.

Power Design USA Website (www.powerdesignusa.com/products/ipod/bodymask.php), pp. 1-2, Copyright 2001-2004.

* cited by examiner

PRINTABLE COVER SYSTEMS FOR ARTICLES

FIELD OF THE INVENTION

The present invention relates generally to printable covers and cover systems for articles.

BACKGROUND OF THE INVENTION

Many consumers desire to apply labels or covers to articles in order to display information relating to the article or to provide an enhanced, decorative appearance to the article. For example, with the advent of writable optical disks, such as CD- and DVD-type optical disks, many consumers wish to apply information to a once-blank optical disk that lists or describes the files subsequently written to the optical disk. While it is generally possible to simply mark directly on the optical disk with a pen or other marking tool, many consumers would rather apply information to the optical disk in a more "finished" or professional manner. In addition, many consumers wish to add decorative features when applying information to an optical disk, such as artwork, photos, colorful highlights, etc.

Printable labels have been developed that allow consumers to print images to a label, for example with an ink-jet printer, and attach or adhere the printed label to an optical disk. Such labels are generally provided with a removable backing that covers and protects an adhesive coating applied to a back of the label to enable the label to be fed through a printer and receive a printed image. After printing the label, a consumer generally removes the backing to expose the adhesive and then attaches the adhesive, and thus the label, to the optical disk.

While relatively simple to use, such labels have proved disadvantageous in that once the backing is removed from the label, the entire adhesive coating is exposed and a consumer must attempt to properly align the label on the optical disk while the consumer's fingers are in contact with the adhesive coating. Contact between the consumer's fingers and the adhesive can compromise the integrity of the adhesive and can also make properly aligning the label relative to the optical disk difficult.

In addition to applying information or decoration to optical disks, many consumers also wish to customize and protect other articles, such as personal digital assistants (PDAs), cell phones, musical players such as MP3 players, etc. Covers have been developed for this purpose that allow a consumer to apply an overlay to the article in question to both protect the article and to add decorative and informational features to the article.

While such overlays have met with some commercial success, they have suffered from many of the problems inherent in printable optical disk covers. For example, once the adhesive on the article overlay is exposed, a user's fingers often contact the adhesive when attempting to align the overly with the article. Contact with the adhesive not only results in difficulty aligning the overly on the article, but the integrity of the adhesive can be compromised by dirt or oil on the user's fingers. In addition, such covers have not been known that wrap around the article from a front side to a back side, thereby improving adherence, while at the same time retaining visibility of branding information that may be present on the sides and/or back of the article.

SUMMARY OF THE INVENTION

It has been recognized that it would be advantageous to develop a cover system that allows a consumer to attach a label to an article while avoiding contact with adhesive between the label and the article. In addition, it has been recognized that it would be advantageous to develop a cover system for articles that allows consumers to cover the article with a printable label without obscuring important information displayed on surfaces of the article, including the back surface of the article where serial numbers, model numbers, and other important branding information is typically present.

The present invention provides a printable label assembly including a printable label having an adhesive coating applied to a first surface thereof to facilitate attachment of the label to an article. The label can be configured to receive a printed image on a second surface thereof. A removable backing can be releasably attached to the adhesive coating of the label and can have at least three sections: a removable primary section releasably attached to a central portion of the adhesive coating of the label and being configured to be removed from the central portion to expose the central portion for attachment to the article; and a pair of removable handle sections releasably attached to outward portions of the adhesive coating of the label, the handle sections being configured to remain on the adhesive coating after removal of the primary section to provide at least two handling points for manipulation by a user to assist the user in applying the label to the article.

In accordance with another aspect of the present invention, a printable label assembly is provided, including a printable label having an adhesive coating applied to a first surface thereof to allow attachment of the label to an article. The label can be configured to receive a printed image on a second surface thereof and can be sized to extend across a top of the article and at least partially around sides of the article and to attach to a portion of a bottom surface of the article. The label can have a pair of side edges, at least one of the side edges having a notched opening defined therein. The opening can be configured to allow the at least one of the side edges of the label to be attached to the bottom of the article such that the notched opening is present on the bottom of the article, said notched opening leaving a portion of the bottom of the article exposed through the notched opening. A removable backing can be releasably attached to the adhesive coating of the label and can be configured to be removed from the coating to allow the label to be attached to the article.

In accordance with another aspect of the invention, a method for covering an article is provided, including the steps of: applying a printed image to a second surface of a printable label having an adhesive coating applied to a first surface thereof; removing a removable primary section of a backing releasably attached to a central portion of the adhesive coating to expose the central portion for attachment to the article; grasping each of a pair of handle sections of the backing releasably attached to outward portions of the adhesive coating; and attaching the primary portion of the adhesive coating to at least a portion of a top of the article.

In accordance with another aspect of the invention, a method for covering an article is provided, including the steps of: applying a printed image to a second surface of a printable label having an adhesive coating applied to a first surface thereof; removing at least a section of a backing releasably attached to a portion of the adhesive coating to expose the portion for attachment to the article; attaching the portion of the adhesive coating to at least a portion of a top of the article; wrapping a side edge of the label around a side of the article, the side edge having a notched opening defined therein; and attaching the side edge of the label to a bottom of the article while leaving a portion of the bottom of the article exposed through the notched opening.

Additional features and advantages of the invention will be apparent from the detailed description which follows, taken in conjunction with the accompanying drawings, which together illustrate, by way of example, features of the invention.

DETAILED DESCRIPTION OF THE PREFERRED EMBODIMENT(S)

Figure 1:
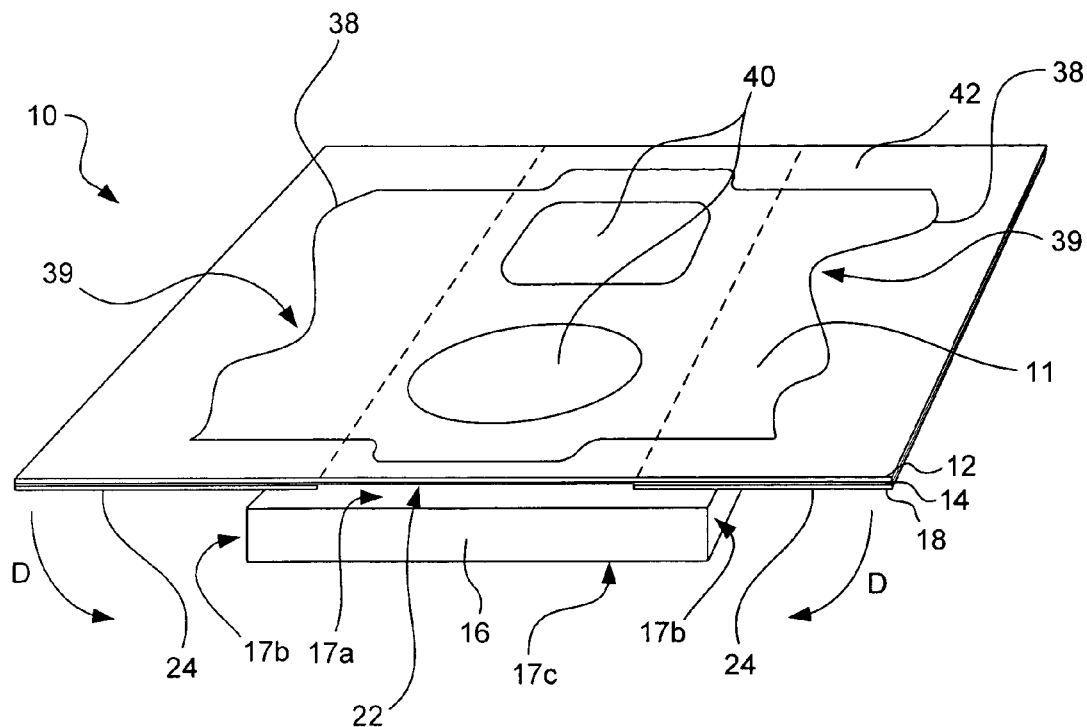
FIG. 1 is a perspective view of a printable label assembly and an article in accordance with an embodiment of the present invention.

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used:

The singular forms "a," "an," and "the" include plural referents unless the context clearly dictates otherwise.

As used herein, the term "printed image" is to be understood to refer to an image applied by a printer that can include a variety of printed material including textual material, pictorial material, iconograchical material, etc., and various combinations thereof. A printed image can be applied using any of a number of known printing methods, without limitation. In one embodiment, the printed image can be applied using a consumer printing device, such as a laser printer or an ink-jet printer.

As used herein, the terms "removable," or "removably attached," are to be understood to refer to an attached relationship between two materials in which the materials remain attached under a first set of conditions but can be unattached from each other without causing significant structural damage to either of the materials and without transferring significant residue from one of the materials to the other.

As used herein, the term "optical disk" or "optical storage disk" refers to a device, or in its plural form, devices, that is/are machine readable and/or writable that can store data information and can be read by an optical data reader. In more detail, the term "optical disk" encompasses audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, and the like. Other like formats may also be included, such as similar formats and formats to be developed in the future.

"Printable label assembly" or "label assembly" includes a printable label sheet having an adhesive coating applied to a first surface, and which is printable on an opposing second surface, and further includes a removable backing attached to the adhesive coating.

"Printable label sheet" or "label sheet" refers to a printable media sheet, which may or may not be precut or scored. A printable label sheet does not include the adhesive coating or the removable backing.

"Printable label" or "label" refers to at least a portion of the printable label sheet, but can include the entire printable label sheet. When the printable label is only a portion of the printable label sheet, the printable label is typically defined by a precut or scored outline, such that the printable label can be easily separated from the balance of the printable label sheet. In other words, the printable label is the object that is actually placed on or attached to an article by an adhesive coating. Typically, the printable label includes a shaped portion of the printable label sheet and adhesive coating associated therewith.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
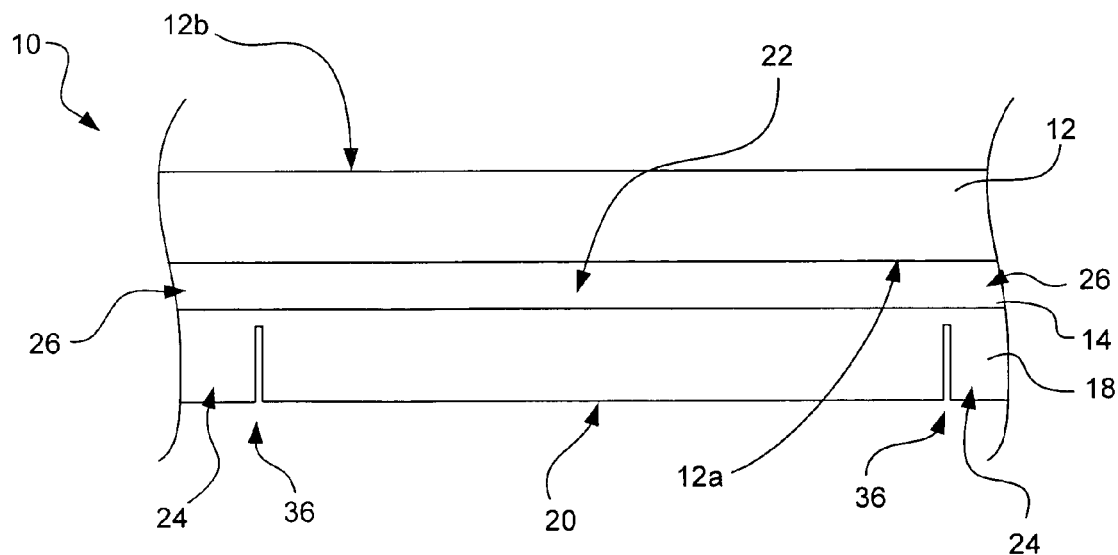
FIG. 2 is a schematic front, partial edge view of the printable label assembly of FIG. 1, with a primary portion of a removable backing attached thereto.
Figure 3:
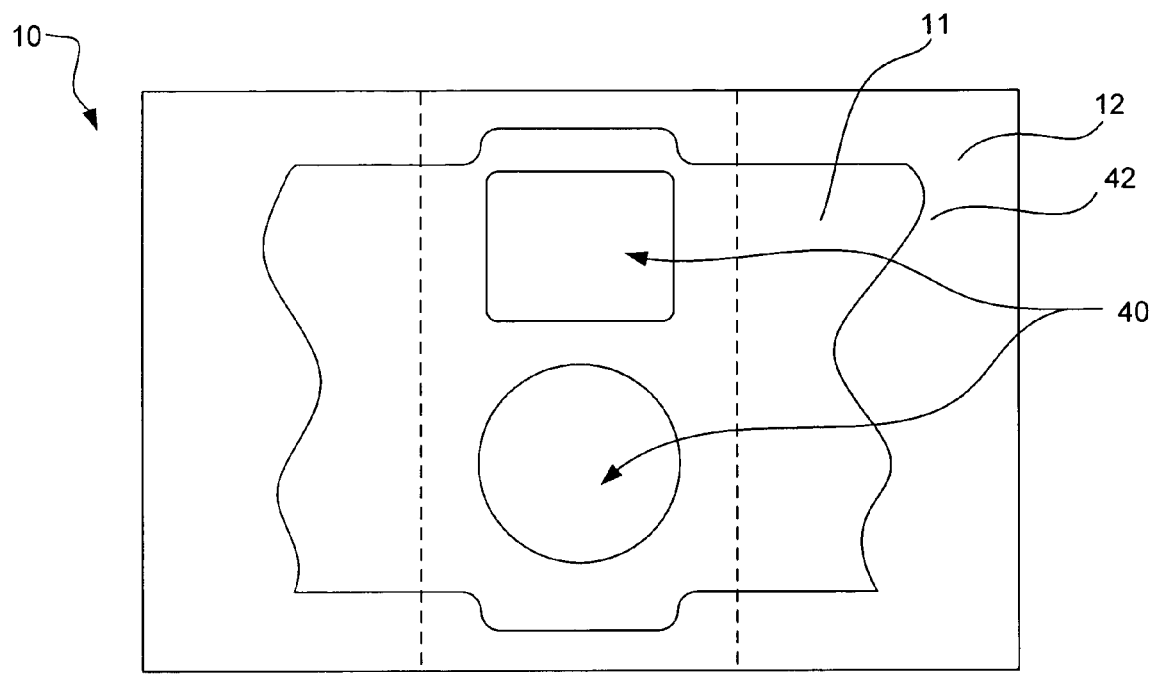
FIG. 3 is a top plan view of the label assembly of FIG. 1.

As illustrated in FIGS. 1, 2, and 3, a printable label assembly 10 in accordance with the present invention is shown that provides a printable label 11 for covering an article 16. While not so limited, the printable label can be a portion of a printable label sheet 12 and can be separable therefrom as an independent object. While the printable label can be a separable portion of the label sheet, to simplify the discussion herein the label and label sheet will be discussed as a whole, with the understanding that the label will generally be separated from the label sheet prior to or during application to the article.

The label sheet 12 (which in this embodiment includes the label 11), can have an adhesive coating 14 applied to a first surface 12a (FIG. 2) thereof to facilitate attachment of the label to the article. The label sheet and label can be configured to receive a printed image (not shown) on a second surface 12b (FIG. 2) thereof. A removable backing 18 can be releasably attached to the adhesive coating of the label and can include at least three sections. The backing 18 can include a removable primary section (20 in FIG. 2 and shown removed from FIG. 1) that can be releasably attached to a central portion 22 of the adhesive coating.

The primary section 20 of the backing can be configured to be removed from the central portion 22 of the adhesive coating 14 of the label 11 to expose the adhesive surface of the central portion for attachment to the article. A pair of removable handle sections 24 can be releasably attached to outward portions 26 of the adhesive coating of the label. The handle sections can be configured to remain on the adhesive coating after removal of the primary section of the backing to provide at least two handling points for manipulation by a user to assist the user in applying the label to the article. Though the pair of handle sections are shown as being of the same size, this is not required.

The printable label can be used to cover and/or protect a variety of articles and can be printed with a variety of printed images to add information or decoration to the various articles. In one aspect of the invention, the printable label assembly 10 is first fed through a printer (not shown) where a printed image (not shown) is applied to the label 11. After receiving the printed image, a user prepares to apply or attach the label to an article 16 by first removing the primary section 20 of the label backing 18. Removal of the primary section of the backing exposes the central portion 22 of the adhesive coating 14 applied to the label.

While the central portion 22 of the adhesive coating 14 is exposed by removal of the primary section 20, the handle sections 24 of the removable backing 18 remain over the outward portions 26 of the backing. In this manner, a user can grasp or manipulate the handle sections of the backing, thus avoiding contact with the adhesive coating covered by the handle sections, while aligning the label with the article 16. After alignment, the central portion of the adhesive coating can be applied to the article, thereby attaching or adhering a central portion of the label on or over the article. Once the central portion of the label is attached, the handle sections of the backing can be removed from the outward portions of the adhesive coating and outward portions of the label can be smoothed outwardly, downwardly, and ultimately, around to the backside of the article to thereby attach the outward portions of the label to the article.

It will be appreciated that the three sections of the removable backing 18, i.e. primary section 20 and two handle sections 24, allow a user to apply the label to the article 16 while eliminating or greatly minimizing any contact between the user's fingers and the adhesive coating 14 applied to the label. This feature of the invention allows the user to accurately align the label over or with the article to ensure that the label is correctly and accurately attached to the article and that few wrinkles or voids appear in the attached label. In addition, by eliminating or greatly minimizing contact between a user's fingers and the adhesive coating applied to the label, the adhesive coating is not compromised by dirt or oil which can otherwise be transferred from the user's fingers to the adhesive. Such dirt or oil might otherwise lead to sections of the adhesive failing to properly bond with the article and may lead to initiation spots where the label may begin to lift away from the article.

Labels in accordance with the present invention can be used on a variety of articles that can benefit from application of a label. Suitable articles include optical disks, such as CD- and DVD-type media, and hand-held electronic articles such as portable music players, cell phones, personal digital assistants ("PDAs"), and the like. FIGS. 1 and 3 illustrate a label assembly 10 for use on an article 16 (FIG. 1) such as a hand-held musical player, wherein the label 11 can be wrapped around the article, becoming attached to a top surface 17a, side surfaces 17b, and at least a portion of a bottom surface 17c of the article.

Figure 4:
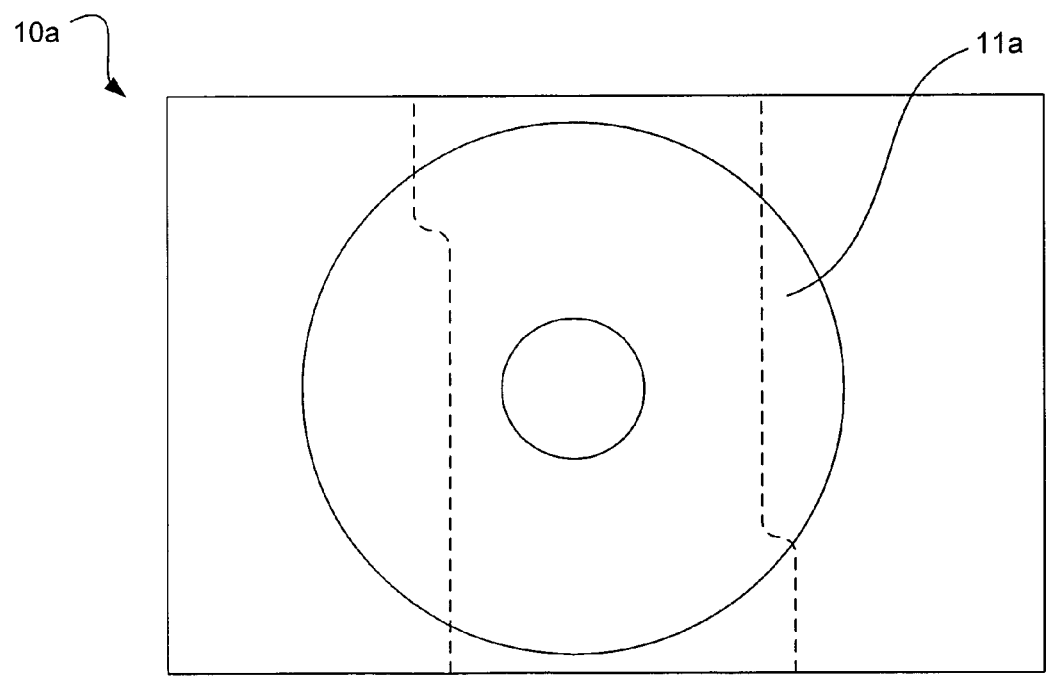
FIG. 4 is a top plan view of another printable label assembly in accordance with an embodiment of the present invention.
Figure 5:
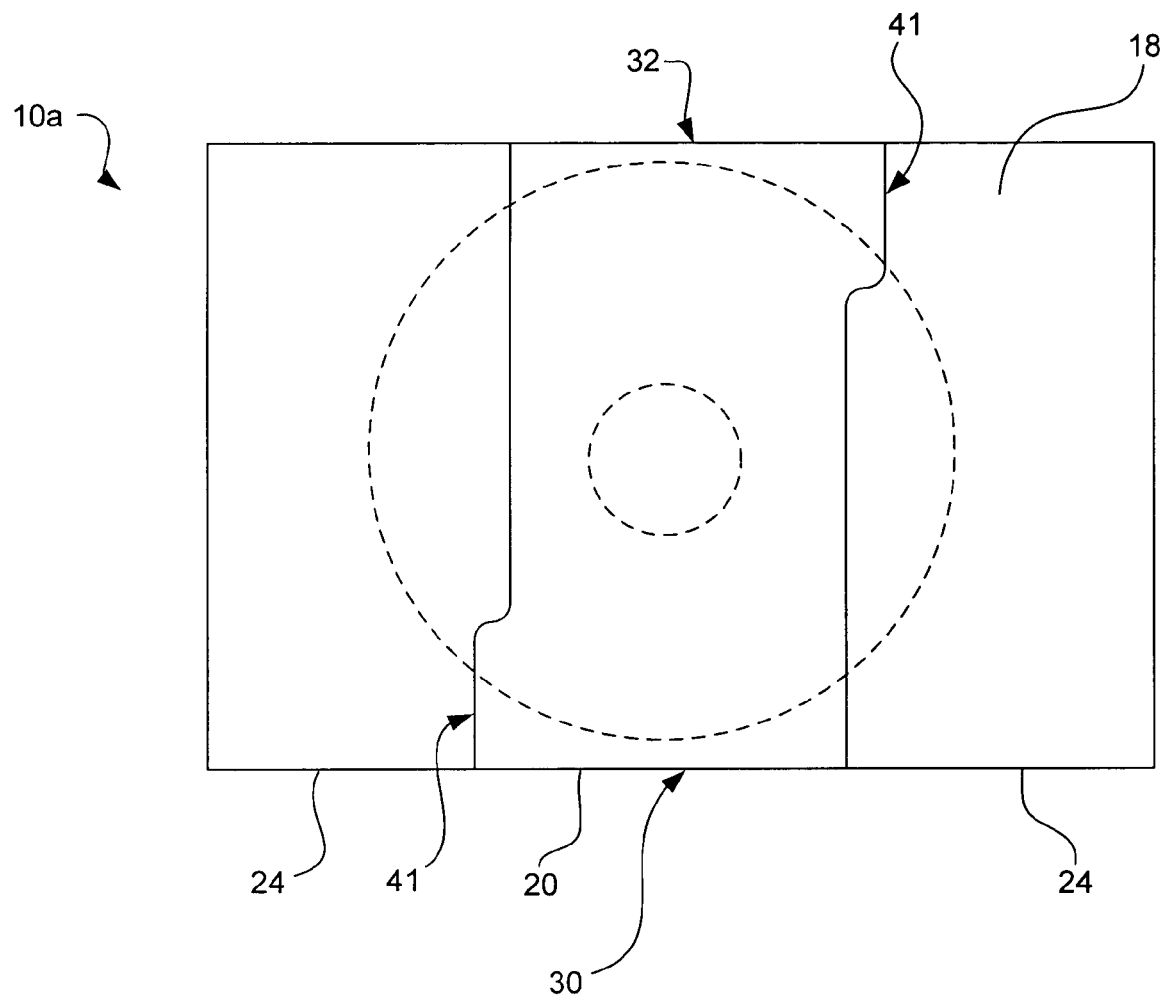
FIG. 5 is a bottom plan view of the printable label assembly of FIG. 4.

FIGS. 4 and 5 illustrate a label assembly 10a having a label 11a for use on an article (not shown) such as an optical disk, where the label is applied only to a front surface of the disk. As a user can apply a variety of printed images to the label prior to attaching the label to the article, the user can customize the label to include a variety of informational content, such as textual descriptions, artwork, color schemes, etc. The printed image can be applied in a variety of known manners, such as by using known software in connection with an ink-jet or laser printer.

The label can be formed from a variety of materials and can serve both a decorative/informational purpose and a protective purpose. In one aspect of the invention, the label is formed of a polymeric material that protects the article from contamination from dust or dirt particles and from scratching. The label can also be formed from a rubberized material that provides some degree of protection from shock-induced damage, protecting the article from damage due to inadvertent dropping.

The adhesive applied to the label sheet 12 in the form of adhesive coating 14 can be selected from a variety of known adhesives. In one aspect of the invention, the adhesive includes a removable adhesive that forms a substantially integral bond with the label but, when applied to the article 16, forms a removable bond between the label and the article. In this manner, the label can be securely attached to the article yet can be removed without great difficulty, and without damaging or leaving adhesive residue on the article. Thus, a user can exchange printed labels with relative ease when the user desires a different label appearance on the article. Also, in the event the user attaches the label to the article in a misaligned or incorrectly placed orientation, the label can be quickly removed from the article and repositioned in a correct orientation.

Examples of suitable releasable adhesive materials for use in the present invention include, without limitation, a variety of adhesives that have a low cohesive strength with articles, bond well to paper or plastic, and are relatively "nontacky" to the touch when dry. The removable adhesive may be applied to the first surface 12a of the label sheet 12 in a fluid state and then converted to a solid by heat, cooling, radiation, or a chemical reaction. Suitable classes of releasable adhesives include water based, hot melt, solvent based, and so-called "100% solids" adhesives. Water-based polymer latexes or hot melts such as waxes or polymeric resins are also suitable adhesives.

As best illustrated in FIG. 5, in one aspect of the invention, the removable primary section 20 of the backing 18 can include a strip that extends from a front edge 30 of the removable backing to a rear edge 32 of the removable backing. In this aspect of the invention, the handle sections 24 are disposed on opposing sides of the primary section. Prior to attaching the label (not shown in FIG. 5) of the label assembly 10a to an article, a user can simply remove the primary section strip and grasp the remaining handle sections to align and apply the label to an article. While the handle sections or strips shown in FIG. 5 comprise approximately ⅓ of the total width of the backing, it is contemplated that the handle strips can be formed of relatively thin strips which comprise only a small portion of the total backing but still provide sufficient area for manipulation by a user's fingers.

In addition to the strip configuration shown in FIG. 5, it is contemplated that the backing section can be applied to the label in a variety of configurations and can include, for example, a primary section that is circumscribed by handle sections disposed about a perimeter of the label (not shown in the FIGs). This feature of the invention may be particularly useful in label assemblies used on optical storage disks, which are often circular in shape.

The removable backing 18 can be divided into sections in a variety of manners known to those in the art. For example, it is contemplated that one or more distinct backing sections can be applied to the adhesive coating (not shown in FIG. 5) individually and adjacent to each other. In other aspects, the backing may be applied as a substantially constant sheet and die-cut or otherwise scored to divide the backing into sections. As shown for example in FIG. 2, the backing 18 can be divided into primary 20 and handle 24 sections by forming slits or cuts 36 in the backing that extend only partially through the backing. In this manner, the backing can tend to remain on the label as a full sheet but can be removed in slits as a user tears a section along the slits away from an adjacent section.

The sections of the backing can also be provided with a geometry that can aid a user in removing the backing from the label. As shown for example in FIG. 5, the removable primary section 20 of the backing can include tabs 41 formed therein that can provide a user a portion to grasp and peel the primary section from the label. It will be appreciated that the tabs of the primary section form inverse tabs in the handle sections that can also be grasped by a user to aid in removing the handle sections from the label.

Returning now to FIG. 1, in one aspect of the invention the article 16 includes a hand-held musical player and the label sheet 12 can be sized to extend across a top 17a of the player and around at least a portion of sides 17b and a bottom 17c of the player. In this aspect of the invention, the central portion of the label corresponding to the central portion 22 of the adhesive coating can be attached to the article first. After attachment of the central portion, label sides 38 of the label can be folded downward (as shown by arrows D) around the sides 17b and bottom 17c of the article. In this manner, the label can not only protect a larger portion of the article than merely the top or face of the article, but the label is more likely to remain attached to the face of the article, as the ends or sides of the label terminate beneath the article.

The pair of side edges 38 can include one or more notched openings 39 defined therein. The opening can be configured to allow the at least one of the side edges of the label to be attached to the bottom of the article while leaving a portion of the bottom of the article exposed by the opening(s). This aspect of the invention can be advantageous when used on electronic articles that often contain branding or regulatory information printed on the bottom of the article. More specifically, the label can advantageously be provided with one or more notched openings that allow sides of the label to be wrapped around and attached to the bottom of the article while leaving exposed, through or by the openings, this often important information that is printed on the bottom of the article.

The label assembly of the present invention can be manufactured in a variety of manners. It is contemplated that the printable label assembly 10 of FIG. 1 can be provided to consumers in sheet form in sizes commonly used in conventional printers, such as letter size sheets, A4 sheets, etc. One or more label assemblies can be oriented on a single sheet of paper, as the size of the article being covered may dictate.

The removable backing 18 can be provided in a sheet that underlies substantially all of the label sheet 12. The label sheet can then be cut to form the shape of the label 11 and also to form a variety of voids, openings or apertures 40 in the label that can be useful to expose operable features (not shown) of the article. Once the shape of the label has been formed or cut in the label sheet, outer label material 42 can be removed from about the label and discarded. The shape of the label and the various apertures can be formed in the label sheet in a variety of manners known to those in the art, including by well-known die-cut techniques used for many years in the label industry.

In addition to the structural elements provided by the present invention and discussed above, the present invention also provides a method for covering an article, comprising the steps of: applying a printed image to a second surface of a printable label having an adhesive coating applied to a first surface thereof; removing a removable primary section of a backing releasably attached to a central portion of the adhesive coating to expose the central portion for attachment to the article; grasping each of a pair of handle sections of the backing releasably attached to outward portions of the adhesive coating; and attaching the primary portion of the adhesive coating to at least a portion of a top of the article.

The method can include the further step of aligning the printed label with the article prior to attaching the central portion to the article. The method can include the further step of removing the pair of handle sections of the backing and attaching the outward portions of the adhesive coating to the article.

In accordance with another aspect of the invention, a method for covering an article is provided, comprising the steps of: applying a printed image to a second surface of a printable label having an adhesive coating applied to a first surface thereof; removing at least a section of a backing releasably attached to a portion of the adhesive coating to expose the portion for attachment to the article; attaching the portion of the adhesive coating to at least a portion of a top of the article; wrapping a side edge of the label around a side of the article, the side edge having a notched opening defined therein; and attaching the side edge of the label to a bottom of the article while leaving a portion of the bottom of the article exposed through the notched opening.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for covering an article having a top surface and a bottom surface, comprising steps of:

applying a printed image to a second surface of a printable label having an adhesive coating applied to a first surface thereof, wherein the label includes a center portion and a pair of side edges, one of the side edges having a notched opening defined therein;

removing a removable primary section of a backing releasably attached to a central portion of the adhesive coating corresponding to the center portion of the label to expose the central portion for attachment to the article;

grasping each of a pair of handle sections of the backing releasably attached to outward portions of the adhesive coating corresponding to the pair of side edges;

attaching the primary portion of the adhesive coating directly to at least a portion of the top surface of the article; removing at least one of the handle sections of the backing corresponding to one of the side edges having the notched opening; and attaching the at least one of the side edges of the label to a bottom of the article while leaving a portion of the bottom surface of the article exposed by the opening.

2. The method of claim 1, comprising the further step of aligning the printable label with the article prior to attaching the central portion to the article.

3. The method of claim 1, wherein the primary section comprises a strip extending from a front of the removable backing to a rear of the removable backing and wherein the handle sections are disposed on opposing sides of the primary section.

4. The method of claim 1, comprising the further step of removing the other handle section of the pair of handle sections of the backing and attaching the other side edge of the label to the bottom surface of the article.

5. The method of claim 1, wherein the article is selected from the group consisting of a PDA, a hand-held musical player, and a cell phone.

6. The method of claim 5, wherein the article comprises the hand-held musical player and wherein the label is sized to extend across a top of the player and around at least a portion of a side and a bottom of the player.

7. The method of claim 1, wherein the portion of the bottom surface of the article has information printed thereon, the information being selected from the group consisting of: branding information and regulatory information.

* * * * *